United States Patent [19]

Payton

[11] Patent Number: 5,737,009
[45] Date of Patent: Apr. 7, 1998

[54] ON-DEMAND DIGITAL INFORMATION DELIVERY SYSTEM AND METHOD USING SIGNAL FRAGMENTATION AND LINEAR/FRACTAL SEQUENCING.

[75] Inventor: David W. Payton, Woodland Hills, Calif.

[73] Assignee: Hughes Electronics, Los Angeles, Calif.

[21] Appl. No.: 627,628

[22] Filed: Apr. 4, 1996

[51] Int. Cl.⁶ ................................................. H04N 7/173
[52] U.S. Cl. ................................................................ 348/7
[58] Field of Search ........................ 348/17; H04N 7/173

[56] References Cited

U.S. PATENT DOCUMENTS

| | | | |
|---|---|---|---|
| 5,414,455 | 5/1995 | Hooper et al. | 348/7 |
| 5,421,031 | 5/1995 | De Bey | 455/5.1 |
| 5,434,678 | 7/1995 | Abecassis | 386/52 |
| 5,589,945 | 12/1996 | Abecassis | 348/7 |
| 5,610,653 | 3/1997 | Abecassis | 348/170 |
| 5,634,849 | 6/1997 | Abecassis | 463/30 |
| 5,664,046 | 9/1997 | Abecassis | 348/7 |

*Primary Examiner*—Howard W. Britton
*Attorney, Agent, or Firm*—V. D. Duraiswamy; W. K. Denson-Low

[57] ABSTRACT

Digital information is delivered on-demand through satellites and other predominantly broadcast transmission systems to local subscribers by fragmenting each digital item into a sequence of ordered fragments and sequencing them based upon the incidence of subscriber requests. Linear and fractal sequencers are used to schedule the fragments when the incidence of requests is respectively below and above a threshold. The linear sequencer responds to the first request by scheduling the item's fragments in order at successive time intervals and responds to each successive request by adding only those fragments that the existing schedule cannot accommodate. The fractal sequencer computes a full fractal sequencing pattern, in which the fragments are scheduled with broadcast periods less than or equal to their fragment numbers, and based upon the incidence of requests deletes the fragments in the full pattern that are not required to satisfy the subscribers' requests. A hybrid sequencer combines the linear and fractal sequencers to minimize the average bandwidth needed to service infrequent requests and places an upper bound on the peak bandwidth required to service frequent requests.

39 Claims, 8 Drawing Sheets

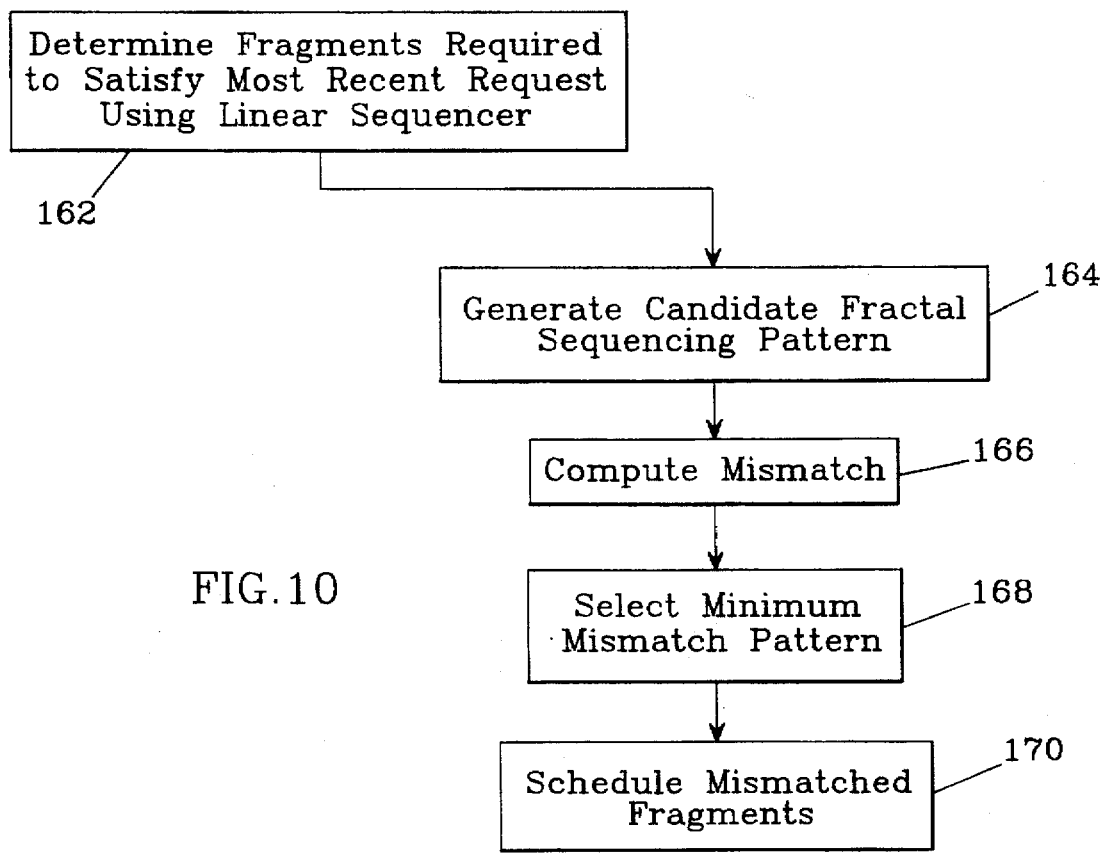
FIG. 10
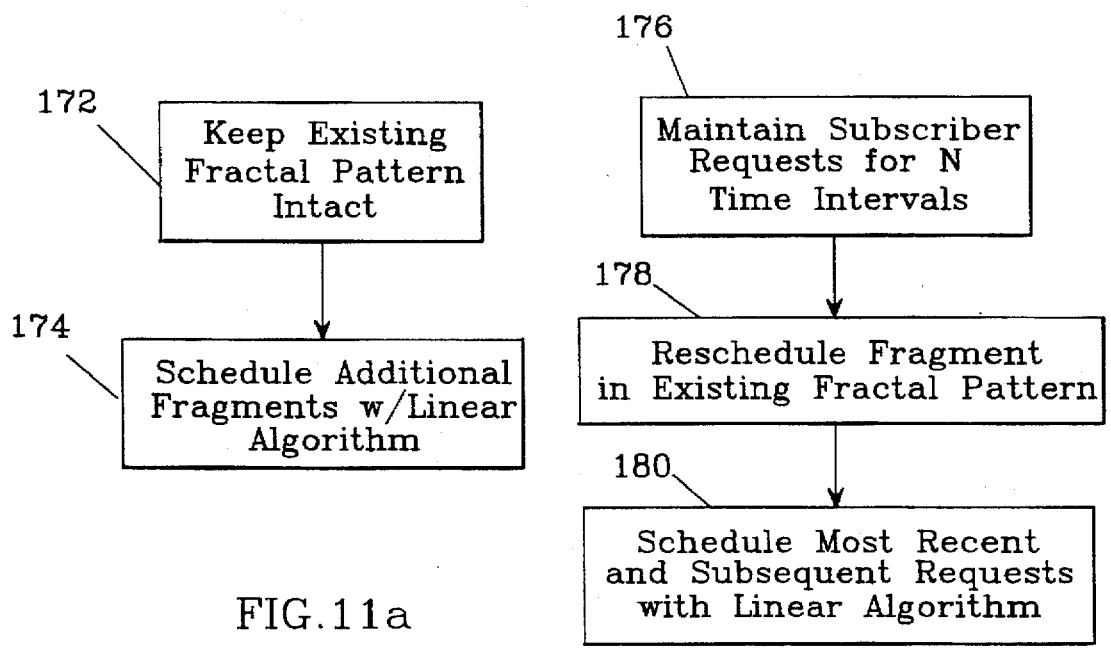
FIG. 11a
FIG. 11b

ON-DEMAND DIGITAL INFORMATION DELIVERY SYSTEM AND METHOD USING SIGNAL FRAGMENTATION AND LINEAR/ FRACTAL SEQUENCING.

BACKGROUND OF THE INVENTION

1. Field of the Invention

This invention relates to on-demand delivery of digital information and entertainment services and more specifically to a digital delivery system and method using signal fragmentation and fractal sequencing to deliver on-demand information over satellites and other predominantly broadcast transmission systems.

2. Description of the Related Art

Existing broadcast systems do not provide true on-demand access but rather provide near on-demand service in which digital video, audio or other information is broadcast to the subscribers at staggered intervals. Near on-demand services are designed to use a relatively small amount of bandwidth so that they can be implemented, and implemented for a profit, on existing transport systems such as cable systems, commercial satellites, and other similar broadcast media. Near on-demand services limit the number of available selections, confine the subscribers to certain viewing times, and do not provide viewing flexibility. Hughes Aircraft Company provides digital direct broadcast systems such as DIRECTV® and DIRECPC™ that broadcast via satellite TV programs and computer applications, respectively.

A true on-demand service would provide a wide range of selections, on-demand access to those selections, and a capability of controlling the broadcast with features such as pause, fast forward and reverse. Because a majority of subscribers use their home entertainment and information systems in the evening, a true on-demand service would require an immense amount of peak bandwidth capability. The existing twisted-pair network cannot provide this bandwidth, and although satellites can physically provide on-demand service it is not cost-effective to allocate a unique portion of bandwidth to each subscriber request.

In anticipation of the next-generation cable and fiber networks that will replace the twisted-pair network and provide a much larger bandwidth, service providers are developing true on-demand systems, in which each subscriber can interact directly with the central video distribution server to preview the available selections, request one of the selections, and control its broadcast. However, the implementation of a complete fiber optic network that provides service to all of the households in the U.S. and worldwide is still far in the future. Secondly, as the number of subscribers and types of services increases, bandwidth considerations will once again become an important issue. Lastly, these next generation systems will remain commercially nonviable with satellite systems.

U.S. Pat. No. 5,414,455 entitled "Segmented video on demand system" to Hooper et al. discloses a centralized video on-demand system that sequentially broadcasts segments of a video signal via a satellite to a plurality of local customers. The segmented broadcast reduces bandwidth requirements by allowing some requests to be synchronized and enables customer interaction and control of the broadcast. If two or more customers request the same video within a few minutes of one another, the system broadcasts the first request at a normal playback rate and broadcasts the later requests at a higher rate until they have caught up to the first signal. At this point, the video delivery is essentially synchronized, and the broadcasts are collapsed into a single broadcast. The local receivers have buffers for storing the higher rate signal and playing it back at the normal rate.

However, only requests that are fairly close in time can be combined. Thus, to service all customer requests the system must still use several channels, corresponding to multiple moving windows in time. Furthermore, the high rate broadcast used to synchronize the channels causes a spike in the peak bandwidth requirement of the communication channel. Reducing the number of moving windows has the effect of increasing the duration of each window. As a result, the spike requires more bandwidth in order to synchronize to a given window. Conversely, reducing the window duration has the effect of increasing the number of channels.

SUMMARY OF THE INVENTION

In view of the above problems, the present invention provides a cost effective system and method for delivering on-demand service of digital information and entertainment services to local subscribers through satellites and other predominantly broadcast transmission systems.

This is accomplished by first fragmenting each digital item into a sequence of ordered fragments and then sequencing them based upon the incidence of subscriber requests. The preferred method for generating a sequencing pattern is a hybrid of a linear algorithm that is used when the incidence of requests is below a threshold and a fractal algorithm that is used when the incidence of requests is greater than the threshold. The linear algorithm responds to the first request by scheduling the item's fragments in order at successive time intervals and responds to each successive request by adding only those fragments that the existing schedule cannot accommodate. The linear algorithm minimizes the average bandwidth needed to service infrequent requests. The fractal algorithm computes a full fractal sequencing pattern, in which the fragments are scheduled with broadcast periods less than or equal to their fragment numbers, and based upon the incidence of requests deletes the fragments in the full pattern that are not required to satisfy the subscribers' requests. The fractal algorithm places an upper bound of approximately ln(N) where N is the number of fragments in the item on the peak bandwidth required to service frequent requests. A transition algorithm is used to execute the linear-to-fractal and fractal-to-linear transitions so that service is not interrupted.

Alternately, either the linear or the fractal algorithm can be used exclusively to schedule the fragments. However, the linear algorithm creates large spikes in the peak bandwidth in response to frequent requests. The fractal algorithm is less efficient in allocating bandwidth than the linear algorithm when the requests are infrequent.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 10 is a flow chart of a preferred forward transition algorithm shown in FIG. 9;

FIGS. 11a and 11b are flow charts of alternate reverse transition algorithms shown in FIG. 9.

DETAILED DESCRIPTION OF THE INVENTION

The present invention provides cost effective on-demand delivery of digital information and entertainment services through satellites and other predominantly broadcast transmission systems. This is accomplished by fragmenting the digital signal into a sequence of N numbered fragments and sequencing the fragments over multiple broadcast channels or equivalent bandwidth to service multiple on-demand requests for a given item when the requests are dispersed over time. In general, the sequencing processor responds to each subsequent request for a given item by adding only those fragments that cannot be provided by the existing sequencing pattern to the pattern and deleting those fragments from the pattern that are no longer required. By dynamically allocating the available bandwidth in this manner, the required bandwidth can be kept relatively low while servicing the on-demand requests of multiple users within one time interval from their respective requests.

A linear sequencer responds to the first request for an item by scheduling the fragments in order over a first channel. For any new request, the linear sequencer determines the fragments that will be unavailable from the ongoing broadcast schedule and schedules the fragments into the latest possible time interval that will allow them to meet the requirements of the new request. The linear sequencer provides minimum bandwidth when the requests are infrequent but produces spikes in the beak bandwidth when the requests are more frequent.

A fractal sequencer schedules the fragments according to a fractal pattern, in which the Jth fragment is repeated at least every Jth time interval, i.e. the broadcast period of each fragment must be less than or equal to the fragment's number. The fractal sequencer selectively omits those fragments that are not needed to satisfy the current on-demand requests. The fractal algorithm places an upper bound on the peak bandwidth that is required to service an unlimited number of frequent requests. However, it is less efficient than the linear algorithm for infrequent requests. As a result, the sequencing processor preferably implements a hybrid sequencer, in which it selects the linear sequencer when the incidence and quantity of requests for the given item made over time fall below a threshold and otherwise selects the fractal sequencer.

Figure 1:
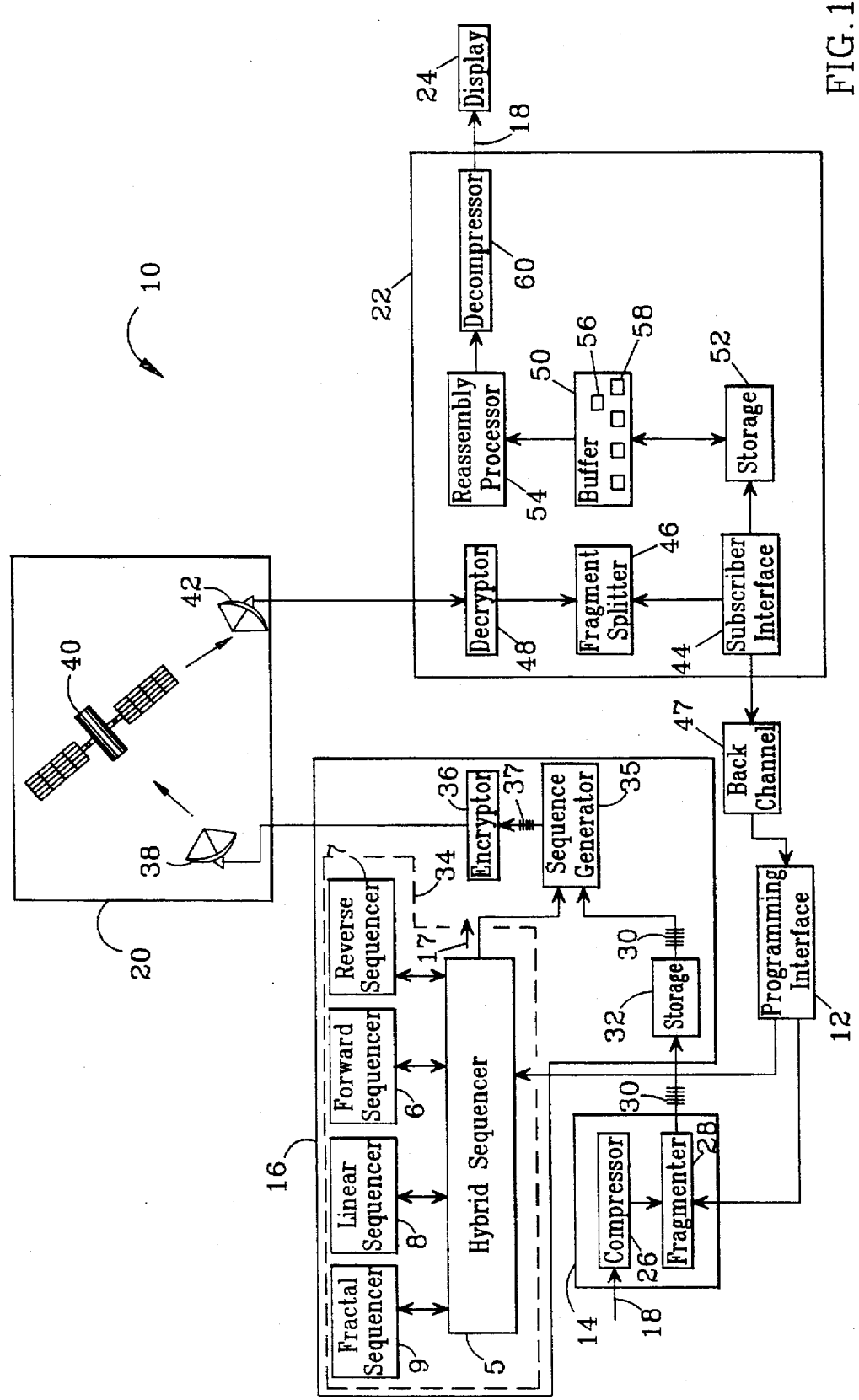
FIG. 1 is a block diagram of an on-demand digital delivery system in accordance with the present invention.

As shown in FIG. 1, an on-demand digital delivery system 10 includes a programming interface 12 for controlling a pre-processor 14 and a central distribution server 16. A broadcaster uses the programming interface 12 to select the items 18 that will be made available to the subscribers. The programming interface 12 directs the pre-processor 14 to compress and fragment the items 18 at a desired time interval off-line and store them in the central distribution server 16. In response to the incidence, i.e. quantity and rate, of requests for a given item, the interface 12 directs the server 16 to preferably select either a linear or fractal sequencer to generate a sequencing pattern 17 for broadcasting the fragments over a number of channels so that each of the requests are serviced within a single time interval. The server 16 broadcasts the sequenced fragments over a digital transport system 20 to a number of local servers 22. If no requests are received for a given item, no data is transmitted. If a request is made at every time interval, the server transmits the fragments in accordance with a full fractal sequence 17. The fragments for the requested item are downloaded, reassembled and played on the subscriber's playback device 24 within one time interval from the subscriber's request.

The pre-processor 14 includes a compressor 26 that compresses the item 18 into a compressed signal, also 18. The conventional Motion Picture Entertainment Group (MPEG2) compression algorithm provides approximately two orders of magnitude of compression while maintaining sufficient signal quality. A fragmenter 28 segments the compressed signal 18 into a sequence of N numbered fragments 30, in which the length of each fragment is the selected time interval. Each fragment 30 is preferably tagged with its fragment number and title. For example, a 90 minute video 18 can be segmented into three 30 minute fragments 30. Alternately, the signal could be divided into other fragment intervals, such as ninety one minute fragments. The functions of the pre-processor 14 can be incorporated into the central distribution server 16 and performed in real time.

The central distribution server 16 preferably includes a digital repository 32, such as a 1000 G Redundant Array of Inexpensive Disks (RAID) system or a rapid access tape drive that can store approximately 600 compressed and fragmented movies, a sequencing processor 34 for generating the sequencing pattern 17, a sequence generator 35 that uses the sequencing pattern 17 and the fragments 30 to generate a multi-channel data stream 37, and an encryptor 36 for encrypting the broadcast data stream. The sequencing processor 34 preferably includes a hybrid sequencer 5 that uses forward and reverse transition sequencers 6 and 7, respectively, to transition between linear and fractal sequencers 8 and 9, respectively, as the incidence of requests changes to generate the sequencing pattern 17 (details of which are provided in connection with FIGS. 2 through 12). The encryptor 36 preferably encrypts each channel of the multi-channel data stream 37 so that only paying subscribers can access the information.

The digital transport system 20 allocates the required number of channels and broadcasts the data streams from the central distribution server 16 to each of the local servers 22. As used herein, the broadcast channels may be discrete channels or portions of the digital bandwidth. Thus, the number of discrete channels or the amount of digital bandwidth changes as the peak bandwidth changes. Because the present invention reduces the amount of bandwidth required to service on-demand requests, existing transport systems including commercial satellites and wire networks, as well as the next generation of fiber optic and cable networks, can broadcast either more selections or can reduce the average time interval required to service a request. The transport system 20 as shown is a satellite network that includes a central transmitter 38, a broadcast satellite 40, and a plurality of local receivers 42. The central transmitter 38 transmits the encrypted multi-channel data stream 37 to the broadcast satellite 40, which in turn retransmits the sequences to the local receivers 42.

Each local server 22 includes a subscriber interface 44 for communicating the available programming to the subscriber and for requesting a particular selection. The playback device 24 preferably includes a display for displaying the available programming and a remote for requesting the selection. The subscriber interface 44 transmits the requests over a low bandwidth back channel 47, such as the telephone wire-to-wire network, to the programming interface 12 and directs a fragment splitter 46 in the local server 22 to retrieve the fragments for the requested selection as they become available. The high bandwidth transport system 20 and low bandwidth back channel 47 can be replaced by a single bidirectional high bandwidth channel such as a point-to-point cable or fiber optic network.

A decrypter 48 decrypts each channel of the data stream 37 as it is received by receiver 42 and passes the numbered fragments to the fragment splitter 46 at each successive time interval. In the preferred embodiment, the fragment splitter 46 identifies each fragment by its tagged selection title and fragment number. Alternately, the sequencing pattern 17 could be transmitted to the local server 22 and used to extract the untagged fragments. The fragment splitter 46 writes the fragments to a buffer 50, which in turn writes them into a local storage 52. The buffer 50 is preferably a dual-port buffer having simultaneous read/write capabilities so that the fragment splitter 46 can write to it at the same time that a reassembly processor 54 reads out the next fragment. The local storage preferably includes enough memory, suitably 1.5 Gbyte, to store at least one complete selection, and a processor for controlling data transfer to and from the memory. In an alternate embodiment, giving up the pause and rewind capabilities reduces the storage requirements by half.

The fragment splitter 46 writes the next fragment 30 that the reassembly processor needs, if the fragment is broadcast during that time interval, into a read location 56 and writes the remaining subsequent fragments 30, if any, into respective write locations 58 in the buffer 50. The local storage 52 reads the fragments from the buffer's write locations 58 and stores them. The local storage 52 writes the next fragment, when it is not directly available from the fragment splitter 46, into the buffer's read location 56. As a result, the first fragment 30 is written into the buffer's read location 56 within one time interval of the subscriber's request, and each successive fragment 30 is written into the read location as the previous fragment is being read out. The reassembly processor 54 seamlessly integrates the successive fragments 30 and passes the sequence to a decompressor 60, which inverts the operation of the compressor 26 and delivers the decompressed digital signal 18 to the subscriber's playback device 24.

The present invention provides limited subscriber interaction capabilities via the subscriber interface 44 by storing the fragments 30 in the local storage 52 until the subscriber has finished viewing or listening to the selection. A pause function is implemented by suspending the read out operation from the buffer. The fragment splitter 46 can continue to fill the local storage with the remaining fragments or can suspend its own operation. A rewind function is implemented by writing previous fragments from the local storage into the buffer. The system cannot implement a fast forward function because the sequencing pattern only guarantees that the next fragment will be available when the current fragment is completed under normal playback conditions. The system's bandwidth requirements can be further reduced by prestoring some of the lower numbered fragments for each selection in the local storage 52.

Figure 2:
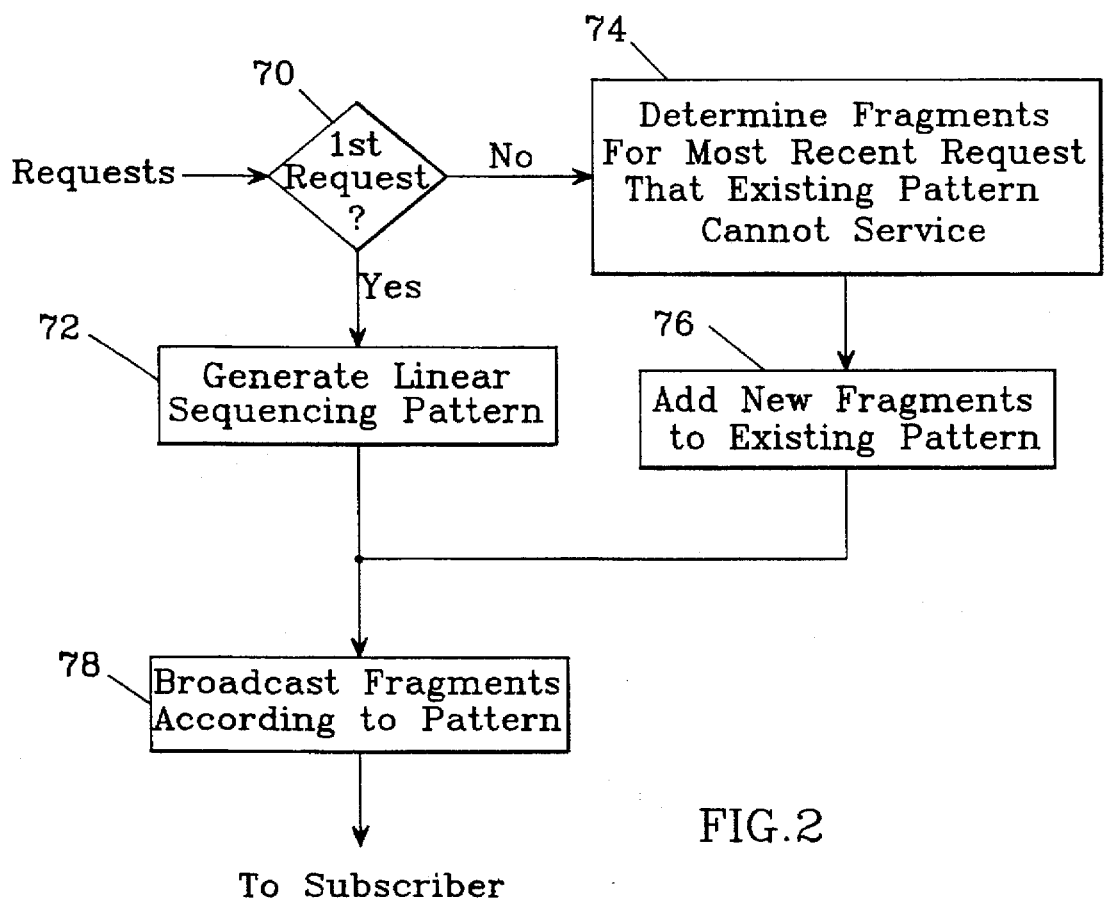
FIG. 2 is a flow chart of a preferred linear algorithm for generating sequencing patterns to service infrequent on-demand requests in accordance with the present invention.

The sequencing processor 34 is preferably programmed to implement the hybrid sequencer 5 that combines the best characteristics of the linear and fractal sequencers 8 and 9, respectively, but can be configured to use the linear or fractal sequencer exclusively. As shown in FIG. 2, the linear sequencer is preferably implemented by programming the sequencing processor 34 shown in FIG. 1 to generate sequencing pattern 17. If the request is the first request or at least the first in N time intervals for a given item (step 70), the linear sequencer generates the linear sequencing pattern 17 by scheduling the item's numbered fragments in order at successive time intervals starting at the next time interval (step 72). For subsequent requests, the linear sequencer determines those fragments that the existing sequencing pattern 17 is incapable of delivering to the requesting subscriber in time to seamlessly integrate the fragments (step 74) and adds the new fragments to the existing pattern at the latest time intervals that will satisfy the requirements of the requesting subscriber's local server to seamlessly integrate the fragments (step 76). In either case, the fragments are broadcast according to the current sequencing pattern (step 78), and then downloaded by the requesting subscribers. As a result, the requesting subscriber's fragment splitter 46 in FIG. 1 sequentially downloads the new fragments and immediately directs them to the reassembly processor. The remaining fragments, which were initially broadcast in response to earlier requests from other subscribers, are captured, temporarily stored in the local storage, and then written out as needed to the reassembly processor.

Figure 3:
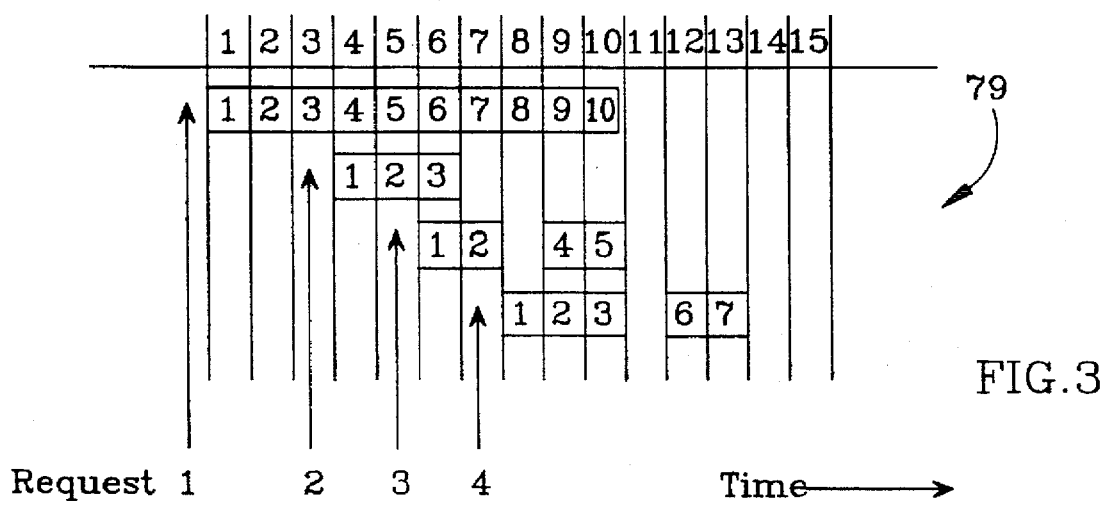
FIG. 3 is a diagram of a sequencing pattern generated by the linear algorithm of FIG. 2.

FIG. 3 illustrates a sequencing pattern 79 of the type generated by the linear sequencer described in FIG. 2. In this example, the digital item includes N=10 fragments. In response to a first request for the item at time interval 0, the ten numbered fragments are scheduled for broadcast in order at successive time intervals beginning with interval 1. In response to a second request at the third time interval, the linear sequencer determines that the first three fragments must be rebroadcast. The requesting user downloads fragments 4–10 associated with the first request and the newly added fragments 1–3. In response to a request at the fifth time interval, the linear sequencer determines that the existing two broadcast channels are incapable of delivering fragments one, two, four and five to the requesting subscriber. The algorithm executed by the linear sequencer minimizes the average bandwidth required to service all of the requests. However, if the incidence of requests is increased, for example once in every time interval, the algorithm can exhibit significant spikes in the peak bandwidth.

Figure 4:
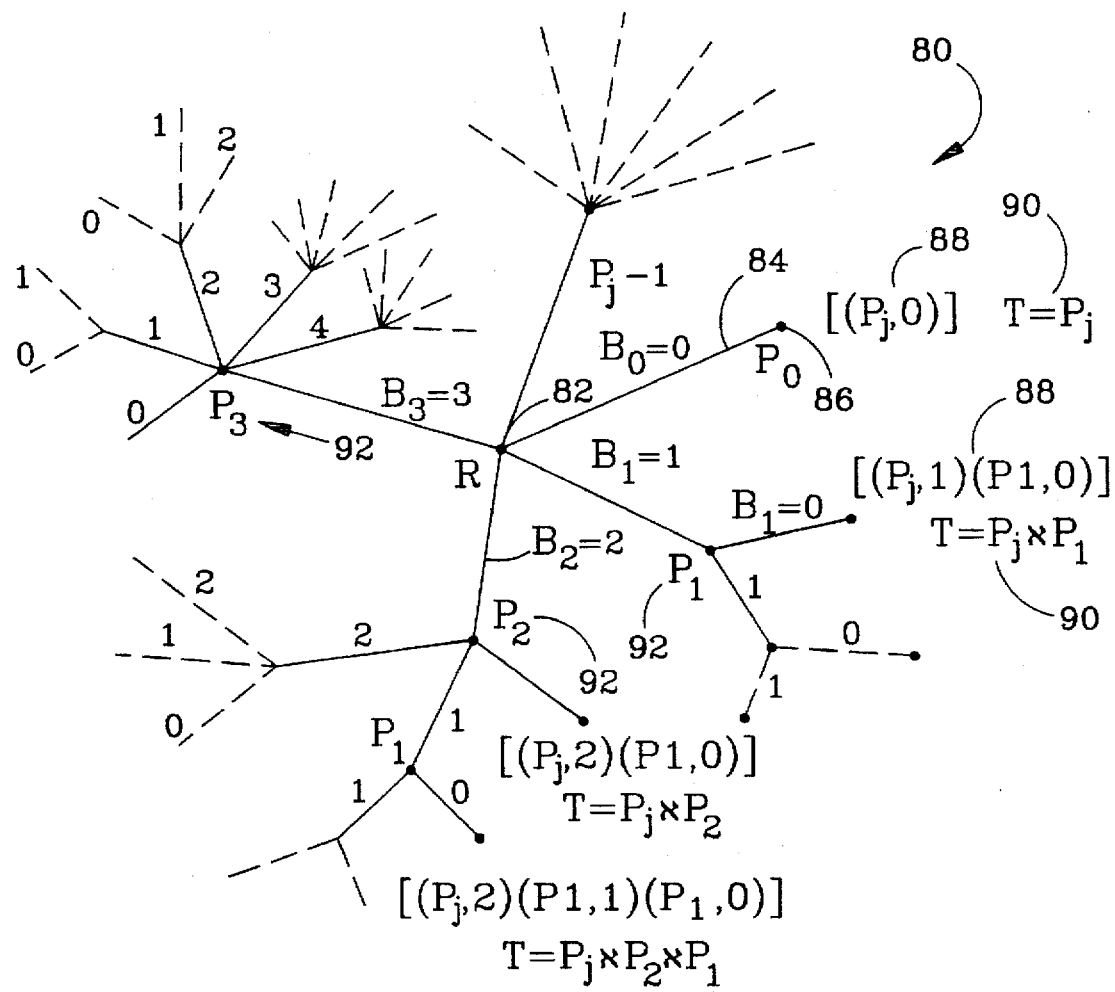
FIG. 4 is a diagram of a pth order fractal tree used by the fractal algorithm.

The fractal sequencer 9 shown in FIG. 1 executes an algorithm that is based upon the expansion of a set of fractal trees and the assignment of the fragments to leaf nodes in the trees, which specify each fragment's broadcast period and offset. FIG. 4 illustrates a $p^{th}$ order fractal tree whose base node R 82 is split into $P_j$ branches 84, where $P_j$ is the jth prime number from a base set. The jth tree in the set is used to schedule fragments in the jth broadcast channel. The branches are numbered from i=0 to Pj−1 and terminate at respective leaf nodes 86. Each leaf node 86 then spawns a subtree 88 with a prime number root Pk, where P0=1, P1=2, P2=3, P3=5, P4=7, . . . , whose leaf nodes in turn each spawn another subtree 92 and so forth. Each leaf node is uniquely identified by a leaf descriptor [(R1,B1)(R2,B2) . . . (Rq, Bq)] where Ri describes the number of branches that split from node i, i.e. the prime number associated with node i, and Bi identifies a particular one of those branches which leads to node i+1 or to the terminal leaf node. The node descriptors are generated by tracking from the tree's root node R 82 through the intermediate leaf nodes 86 to each terminal leaf node. When fragments are assigned to the leaves of a fractal tree that is defined in this manner, each leaf descriptor defines both the broadcast period and timing offset of a different fragment.

Figure 5:
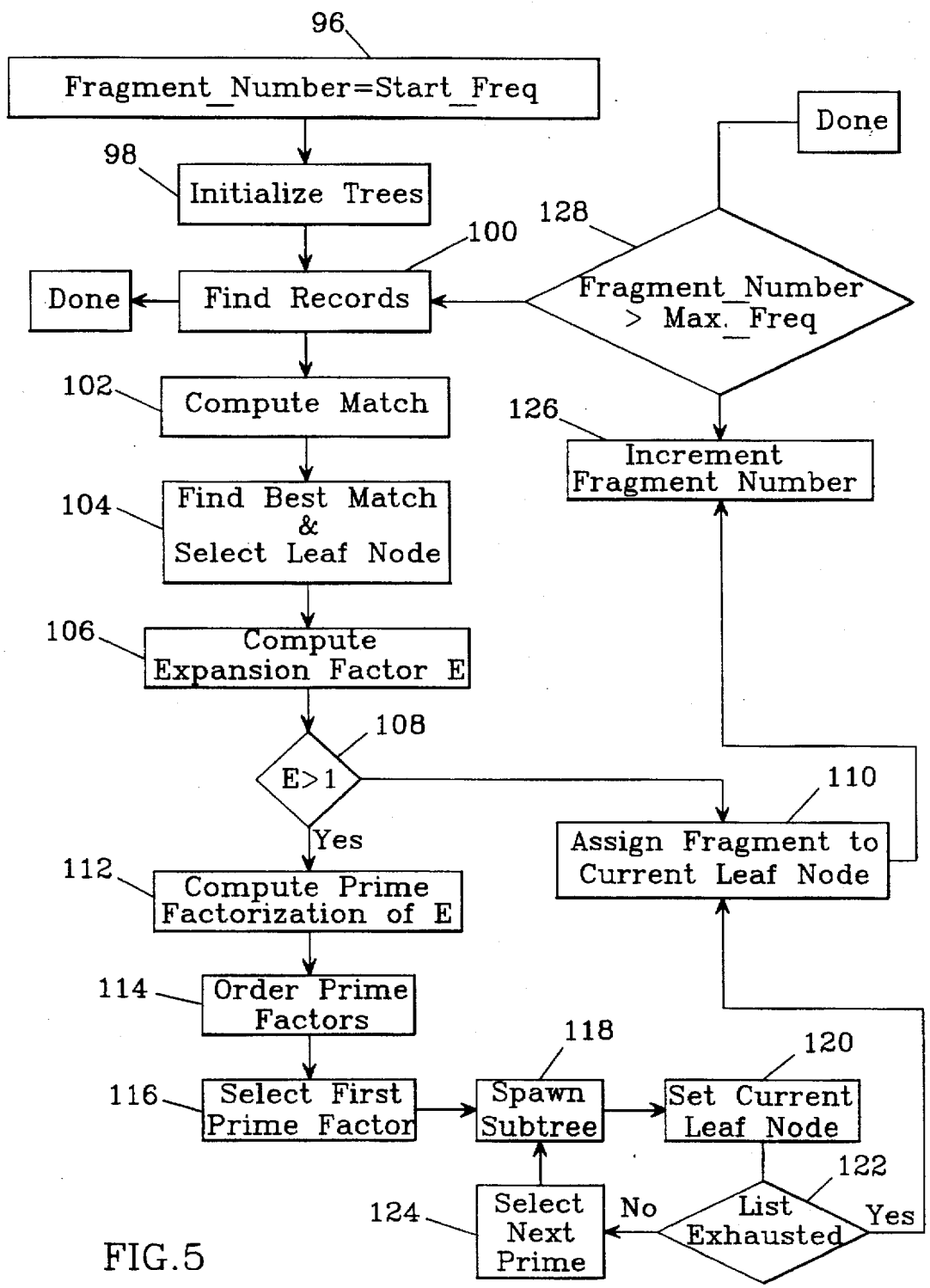
FIG. 5 is a flow chart of a preferred algorithm for generating a full fractal sequencing pattern using fractal trees of the type shown in FIG. 4.
Figure 6:
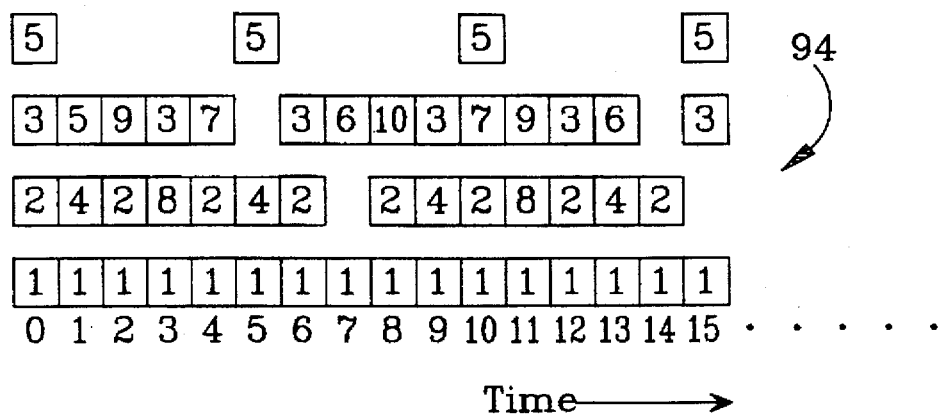
FIG. 6 is a diagram of a full fractal sequencing pattern generated by the fractal algorithm of FIG. 5.

FIG. 5 illustrates a preferred fractal sequencing algorithm for assigning periods and offsets to the N fragments to generate a full fractal sequencing pattern 94 of the type shown in FIG. 6. This method applies both to the case where no fragments are pre-stored as well as the case where the first L fragments are pre-stored locally with the subscribers. A constant start_frag is the number of the first fragment that is transmitted to the user. If no fragments are pre-stored, start_frag=1 and if L fragments are pre-stored then start_frag=L+1. In step 96, a control variable fragment_number is initialized to start_frag.

In the step 98, "Initialize Trees", the fractal trees that are used to allocate the fragments are initialized. The number of initialized fractal trees equals the number of equivalent channels (M) of allocated bandwidth. The root number Pj in the base set are the successive prime numbers 1, 2, 3, 5, 7, 11, . . . up to the number of trees. When k trees are initialized, they are assigned root numbers from P1 to Pk in succession. In general, the assignment starts with the prime number 2 for all sequences where the first fragment is two or greater. Upon initialization, each fractal tree is expanded by splitting its root node into Pj branches Bi numbered from i=0 to Pj−1 and terminating it at unassigned leaf nodes. Each leaf node remains unassigned until it is expanded with a sub-tree or a fragment is assigned to the leaf node.

In step 100, "Find Periods", the broadcast period T of a given leaf node is the product of the leaf nodes Rk traversed from the root node to the particular leaf node, and is computed as follows:

$$T = \prod_{k=1}^{q} Rk \qquad (1)$$

where Rk is the prime number of the $k^{th}$ traversed leaf node and q is the number of nodes traversed from the root node to the particular leaf node. The periods of all unassigned leaf nodes in each fractal tree are tallied. The expansion of each fractal tree terminates when all of its leaf nodes have been assigned a fragment.

In step 102, "Compute Match", a score is computed for each unassigned leaf node based on its period. This score is equal to the difference between the current value of fragment_number and the largest integer multiple of the branch period T that is still smaller than the current value of fragment_number, as given by:

$$\text{Score} = \text{fragment\_number} - T*\text{floor}(\text{fragment\_number}/T) \qquad (2)$$

The next step 104 is to find the best, i.e. minimum, match score from all of the computed scores. The best period T_best is the period corresponding to the best match score. If two match scores are equal, the best period is the largest of the two periods corresponding to these scores. The best fractal tree is the tree containing the leaf node with the best period. Together steps 100, 102 and 104 select the best tree and an unassigned leaf node for a particular fragment.

Once the best fractal tree and leaf node have been selected, the leaf node is expanded and the fragment is assigned to one of the expanded leaf nodes. In step 106, an expansion factor E is computed as the largest integer which when multiplied by T_best will give a result that is less than or equal to the current value of fragment_number. In step 108, if E=1, the current leaf node cannot be expanded any further, and control is transferred to step 110, in which the current value of fragment_number is assigned to the current leaf node. If E>1, then the prime factorization of the extension factor E is computed in step 112. In step 114, the prime factors are ordered from smallest to largest (Pa, Pb, . . . Pn) and the first prime factor is selected (step 116) from this list and a variable Pk is set to this value.

In step 118, a subtree is spawned from the current leaf node with Pk branches Bi that are numbered from i=0 to Pk−1. In step 120, the current leaf node is set to the leaf node on the first branch B0 of the new subtree. In step 122, the list of ordered prime factors is checked to see if has been exhausted. If not, the next prime is selected (step 124) from the ordered list and assigned to Pk, and steps 118 and 120 are repeated recursively to spawn the next subtree from the current leaf node of the previous subtree. For example, if E=8 the prime factors are 2, 2 and 2 and the algorithm recursively spawns three two-branch subtrees. When the list has been exhausted, transfer returns to step 110 and the current value of fragment_number is assigned to the current leaf node.

After the current fragment is assigned to a leaf node, the value of fragment_number is incremented (step 126). If this value is greater than the maximum number of desired fragments (max_frag) (step 128), the algorithm terminates. Otherwise, the algorithm returns to the "Find Periods" step 100 and continues to fill in the fractal trees until all of the trees are filled or the maximum value of fragment_number is exceeded.

Once the fragments are assigned to the fractal trees' leaves, the trees are used to compute the fragments' periods and sequence offsets. The period of each fragment is determined using equation 1 above. The offset for a given leaf node is computed as follows:

$$\text{Offset} = \sum_{p=2}^{q} Bp \prod_{k=1}^{p-1} Rk + B1 \qquad (3)$$

where q is the number of nodes traversed from the root node to the particular leaf node.

Once the assignments have been made using equations 1 and 3 above, a number of transformations may be performed that will produce different, but equally suitable, sequences. For example, one transformation relabels the branches Bp of a subtree such that the same set of numbers is assigned to the branches in a different order. This merely changes the relative offsets of the fragments in the sequence. Another transformation takes any two segments S1 and S2 that have been assigned periods T1 and T2, respectively, where T1≦T2≦MIN(S1, S2), and swaps positions of S1 and S2 on their respective trees. This swap can occur between two items on the same tree as well as between two items on different trees so long as the periods assigned to both fragments are both less than or equal to the minimum period required for each fragment.

As shown in FIG. 6, the full fractal sequencing pattern 94 generated by the fractal algorithm of FIG. 5 is capable of immediately servicing any on-demand request. Thus, the full pattern represents the most information that will ever have to be transmitted regardless of the quantity and rate of requests. As a result, the full pattern places an upper bound, approximately 1+ln(N), on the peak bandwidth that will ever be required to service requests. As shown, the numbered fragments are broadcast at periods equal to or less than their corresponding fragment numbers. Specifically, fragments 1–6, 8 and 9 are broadcast at periods equal to their fragment numbers and fragments 7 and 10 are backfilled into periods 6 and 9, respectively. Continuously broadcasting the full pattern guarantees that for any on-demand request the first fragment will be delivered within one time interval from the request, the second fragment will be delivered within two time intervals, and so forth so that the subscriber's local server can seamlessly integrate the fragments to recreate the requested digital item. However, if the incidence of requests is reduced, although still relatively frequent, the full pattern 94 occupies more bandwidth than is necessary to service the on-demand requests.

Figure 7:
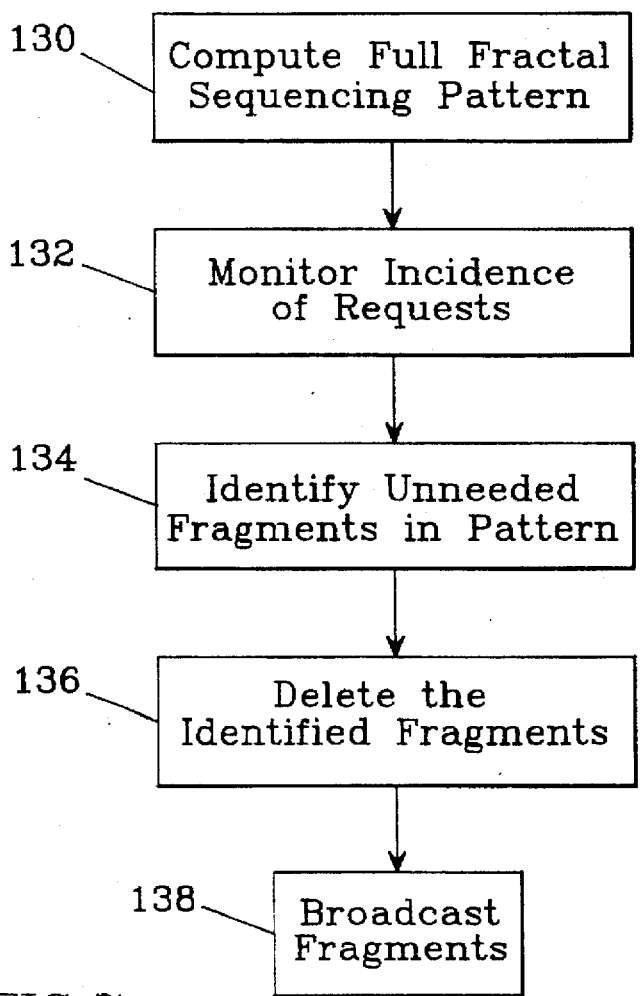
FIG. 7 is a flow chart of a preferred fractal algorithm for generating fractal sequencing patterns from the full fractal sequencing patterns shown in FIG. 6 to service frequent on-demand requests.

As shown in FIG. 7, the fractal sequencer is programmed to dynamically modify the full fractal sequencing pattern 94 produced by the fractal algorithm described above in FIG. 5 to generate the sequencing pattern 17. In step 130, the sequencer executes the fractal algorithm to generate the full fractal sequencing pattern for the requested digital item. Alternately, the full pattern can be precomputed. Thereafter, the fractal sequencer monitors the incidence of requests for the digital item (step 132) and identifies those fragments in the full fractal sequencing pattern that are not required to service the current requests (step 134). The fractal sequencer deletes the identified fragments (step 136) from the full fractal sequencing pattern and broadcasts the fragments in accordance with the remaining sequencing pattern (step 138). If the frequency of requests is high, few if any fragments are deleted from the pattern. Conversely, if the frequency is low, a large number of the fragments are deleted. As a result, the peak bandwidth changes dynamically in response to the incidence of requests for a given digital item.

Figure 8:
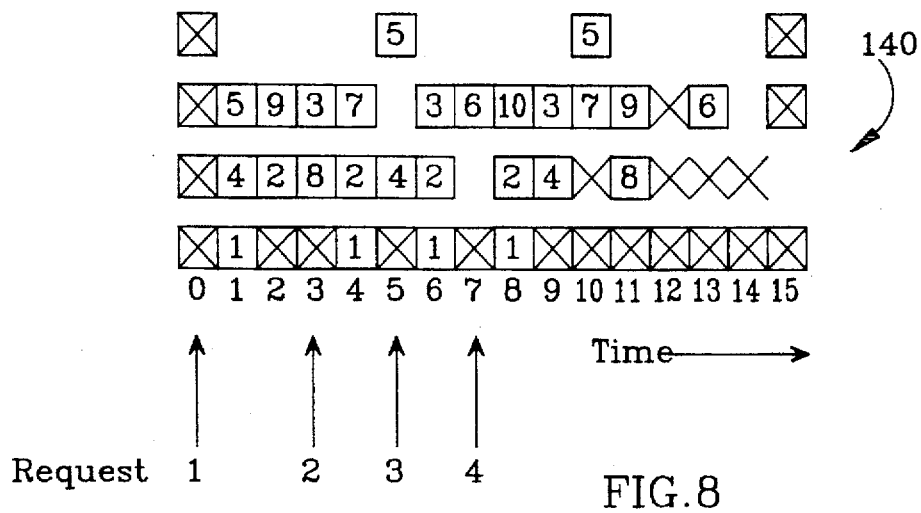
FIG. 8 is a diagram of a fractal sequencing pattern omitting those fragments from the pattern in FIG. 6 that are not required to satisfy the current on-demand requests.

As shown in FIG. 8, a dynamic fractal sequencing pattern 140 generated by the algorithm of FIG. 7 is capable of servicing the four on-demand requests shown. The broadcast of the pattern is initiated at the first interval after the first request. Prior to receiving the first request for a given item, no fragments are transmitted and thus no bandwidth is used. To service the initial request, the server transmits the first fragment once and then omits it during time intervals two and three. A second request during the third time interval causes the first fragment to be transmitted at the next time interval. After the last request, the numbered fragments are selectively omitted when they are no longer required to service the previous requests. A subsequent request will reinitiate the fractal sequencing pattern. In general, any fragment with assigned period T which occurs in the fractal sequence more than T time intervals after the most recent request will be omitted. As a result, the peak bandwidth varies dynamically in response to the incidence of requests. The required bandwidth has an upper bound of approximately 1+ln (N) where N is the number of fragments in the digital item and a lower bound of zero.

Figure 9:
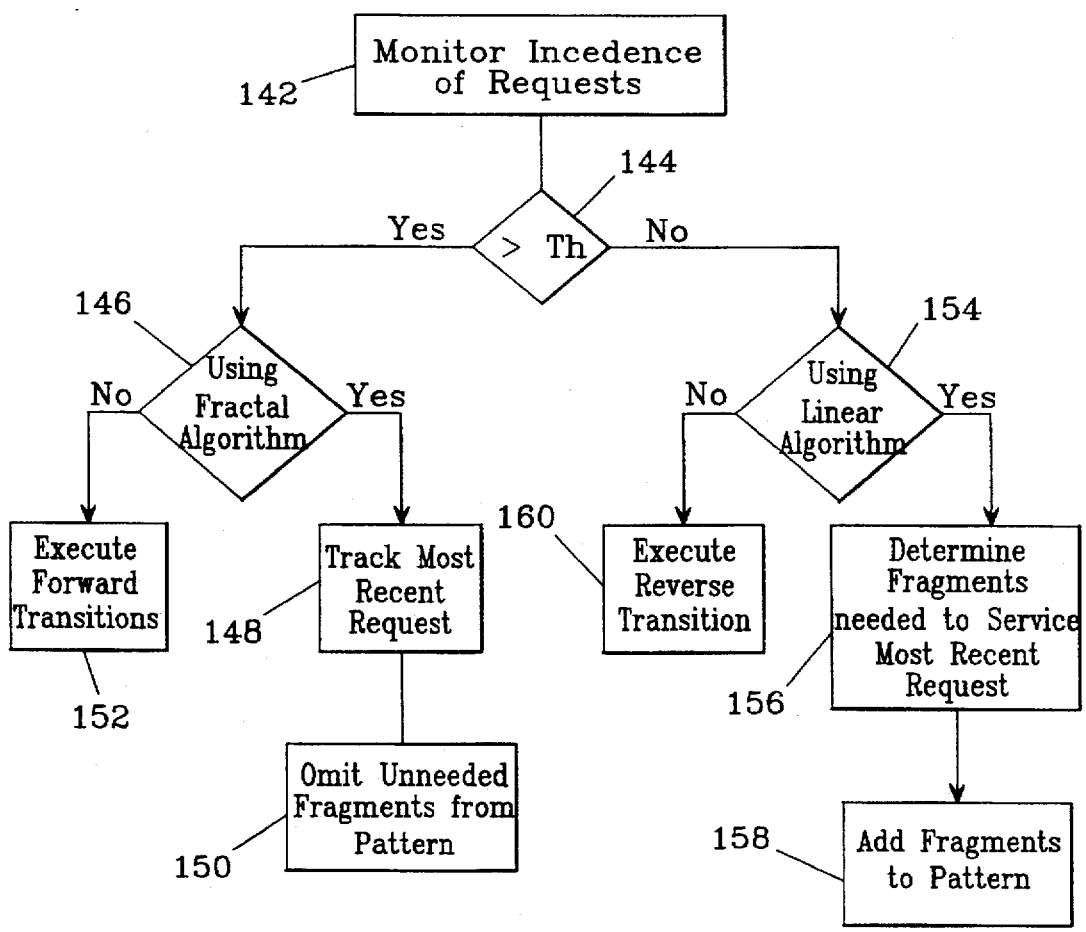
FIG. 9 is a flow chart of a preferred hybrid algorithm for generating sequencing patterns that service both frequent and infrequent requests.

As shown in FIG. 9, the preferred method of generating the sequencing pattern 17 shown in FIG. 1 is to program the sequencing processor 34 to implement the hybrid sequencer 5 that includes the linear sequencer 8, the fractal sequencer 9, and forward and reverse transition sequencers 6 and 7, respectively, for switching back-and-forth between the two sequencers when the incidence of requests cross a threshold. In step 142, the hybrid sequencer monitors the incidence of requests for a given digital item where the incidence is the quantity and rate of requests for the item. If the incidence of requests is greater than a threshold (step 144), the hybrid sequencer determines whether it is currently using the fractal or the linear sequencer (step 146). If the fractal sequencer is currently generating the sequencing pattern, it continues by tracking the most recent request (step 148) and omitting the unneeded fragments from the full fractal sequencing pattern (step 150) as described in FIG. 7. Otherwise, the hybrid sequencer uses the forward transition sequencer (step 152) to execute a smooth transition from the linear sequencer to the fractal sequencer as shown in detail in FIG. 10.

If the incidence of requests is less than a threshold (step 144), the hybrid sequencer determines whether it is currently using the fractal or the linear sequencer (step 154). If the linear sequencer is currently generating the sequencing pattern, it continues by determining the fragments needed to service the most recent request (step 156) and adding those fragments to the existing sequencing pattern (step 158) as described in FIG. 2. Otherwise, the hybrid sequencer uses the reverse transition sequencer (step 160) to execute a smooth transition from the fractal sequencer to the linear sequencer as shown in detail FIGS. 11a and 11b.

As shown in FIG. 10, the forward transition sequencer 6 shown in FIG. 9 and employed by the hybrid sequencer as shown in FIG. 9 is programmed to first determine the sequencing pattern that would be produced the linear sequencer in response to the new request (step 162). This includes previously scheduled fragments as well as newly scheduled fragments. All of the fragments from this sequence that remain to be transmitted are then rescheduled to conform to a fractal sequencing pattern. To execute a smooth transition, a set of candidate fractal sequencing patterns are generated (step 164), a mismatch score is computed between each candidate pattern and the fragments that must be rescheduled (step 166), and the candidate pattern with the smallest mismatch score is selected to be the new sequencing pattern (step 168). A mismatch occurs when a fragment which would occur in the sequencing pattern generated by the linear sequencer does not occur at the same time interval or earlier within the candidate fractal sequencing pattern. To handle whatever mismatches exist between the selected pattern and the fragments that must be scheduled, the fractal sequencer schedules the mismatched fragments as transition fragments (step 170). The transition fragments temporarily increase the peak bandwidth, but do not become part of the regular sequencing pattern.

The set of candidate patterns generated in step 162 is defined as all patterns in which the assigned broadcast periods of each fragment is less than or equal to its fragment number. The different candidate patterns are generated by either modifying the relative timing offsets of the fragments assigned from a single fractal tree or by swapping fragments between two different trees. As shown in equations 1 and 3 above, the format is generated by interchanging the values of $B_i$ in the leaf descriptors while leaving the values of $R_i$ unchanged. However, when one fragment is shifted in this manner it displaces another fragment. Furthermore, if an intermediate leaf node is shifted, it may cause multiple leaf nodes in that tree to shift. Because the fractal trees assigned to the respective broadcast channels are independent of each other, the sequence used for one channel can be altered without impacting the choice of sequences for the other channels. However, when fragments are swapped between trees, all of the channel sequences must be considered. To find the sequence that minimizes the number of transition fragments, a number of tree configurations (candidate patterns) must be compared to the present broadcast requirements.

As shown in FIGS. 11a and 11b, the reverse transition sequencer 7 shown in FIG. 1 and employed by the hybrid sequencer as shown in FIG. 9 is programmed to provide a smooth transition from the fractal sequences to the linear sequences when the incidence of requests falls below the threshold. As shown in FIG. 11a, the sequencing pattern generated by the fractal sequencer to service past requests is kept intact (step 172) and the fragments for the most recent requests and subsequent requests are scheduled by the linear sequencer (step 174). Alternately, as shown in FIG. 11b, the transition sequencer maintains the subscriber requests for the last N time intervals (step 176) where N is the number of fragments in the item, reschedules the fragments in the existing sequencing pattern (step 178) by performing the following steps for each fragment (step 180). After determining the assigned period T for the $k^{th}$ fragment, the reverse sequencer locates the earliest request that is no more than T time intervals prior to the scheduled broadcast time for the fragment. The reverse sequencer then schedules the $k^{th}$ fragment to occur at the $k^{th}$ time interval after this earliest request. Once this is accomplished for each of the scheduled fragments, the sequencer schedules the most recent request and subsequent requests with the linear sequencer.

Figure 12:
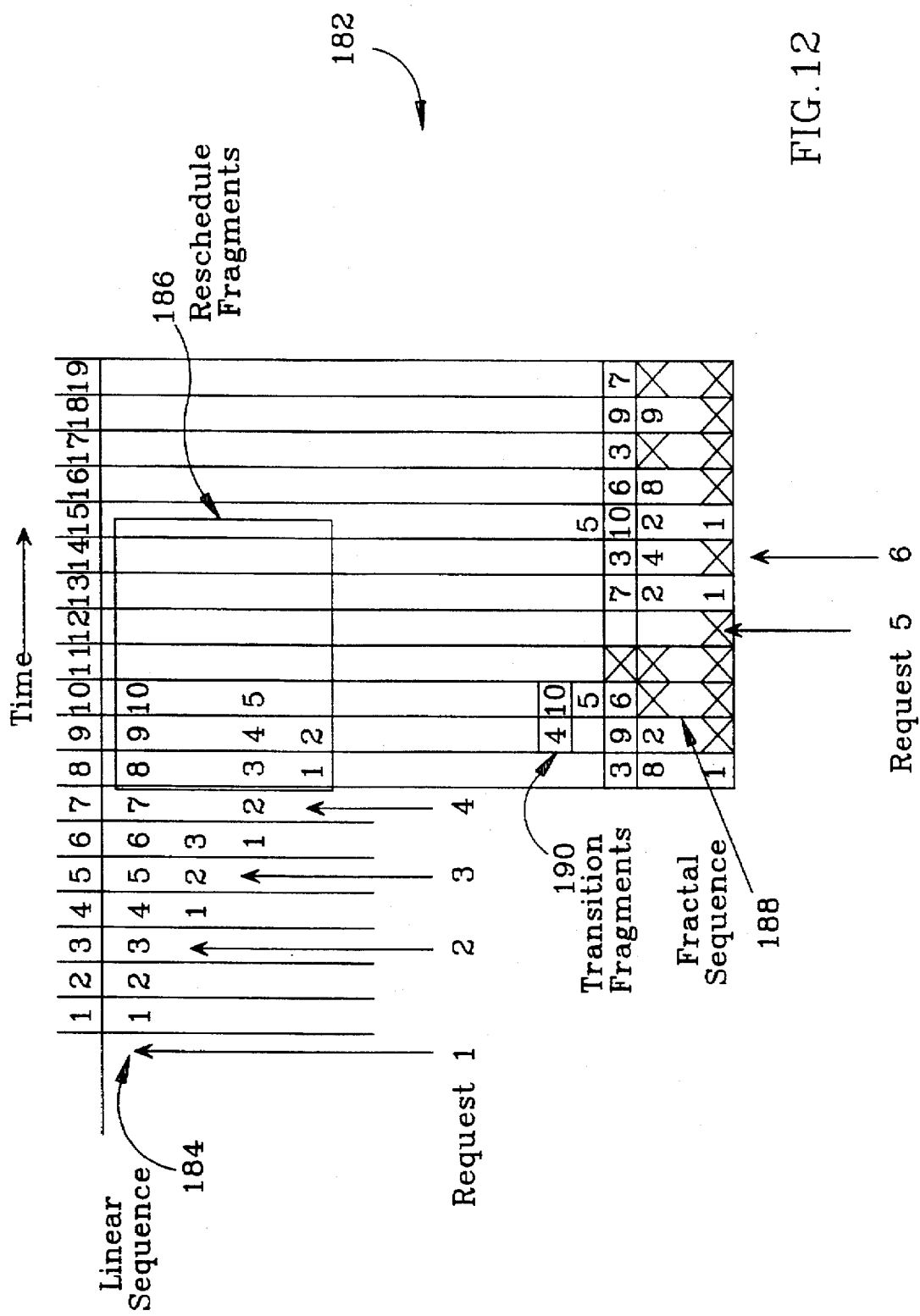
FIG. 12 is a diagram of a sequencing pattern generated in accordance with the hybrid algorithm of FIG. 9.

A sequencing pattern 182 of the type generated by the hybrid sequencer is depicted in FIG. 12. The incidence for the first three requests falls below the threshold, and thus the linear sequencer generates a linear sequencing pattern 184. The occurrence of the fourth request causes the incidence to cross the threshold. As a result, the forward transition sequencer reschedules the remaining fragments 186 by generating a fractal sequence 188. Fragments 4 and 10 represent the mismatches between the fractal sequence 188 and the existing and new fragments that would be broadcast using the linear sequencer. These fragments are scheduled as transition fragments 190 in the fifth broadcast channel.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A system for delivering near on-demand digital information to a plurality of local subscribers, comprising:
   - a fragmentation unit that fragments a digital item into a sequence of N numbered fragments;
   - a sequencing processor that responds to a subscriber request for the digital item by generating a sequencing pattern having average and peak bandwidths, said sequencing processor selectively adding and deleting fragments from the sequencing pattern based upon the incidence of requests for the digital item such that the average bandwidth required to service requests occurring with an incidence less than a threshold is set at a low value and the peak bandwidth required to service requests occurring with an incidence greater than the threshold is bounded by an upper bound;
   - a sequence generator that sequences the fragments into a multi-channel data stream in accordance with the sequencing pattern;
   - a digital transport system that continuously broadcasts the multi-channel data stream over a plurality of channels at successive time intervals to the local subscribers; and
   - a plurality of local servers for extracting the fragments from the multi-channel data stream, seamlessly integrating the fragments and delivering them to a plurality of playback devices.

2. The system of claim 1, wherein the sequencing processor is programmed to implement a linear sequencer for incidences less than the threshold, which:
   a) in response to a first request for the digital item, schedules the item's fragments in order at successive time intervals;
   b) in response to each successive request, determines the fragments that the existing sequencing pattern is incapable of delivering to the requesting subscriber; and
   c) adds those fragments to the existing sequencing pattern at the latest time intervals that will satisfy the requirements of the requesting subscriber's local server to seamlessly integrate the fragments.

3. The system of claim 2, wherein said linear sequencer minimizes the average bandwidth required to service requests when the incidence is below the threshold.

4. The system of claim 2, wherein a subscriber's request adds M fragments of the digital item to the existing sequencing pattern, each local server comprising:
   - an interface for generating the subscriber request for a given digital item;
   - a local storage for storing fragments;
   - a reassembly processor for receiving the first fragment of the requested item within one time interval from the request and integrating it with succeeding fragments to seamlessly deliver the digital item to the local subscriber; and
   - a fragment splitter for a) sequentially downloading the M fragments of the requested item and directing them to the reassembly processor, and b) concurrently capturing the remaining fragments for the requested item, which were broadcast in response to previous requests from other subscribers, temporarily storing them in the local storage, and then writing them out as needed to the reassembly processor.

5. The system of claim 1, wherein the sequencing processor is programmed to implement a fractal sequencer for incidences greater than the threshold, which:
   a) computes a full fractal sequencing pattern, in which the fragments are scheduled to have broadcast periods less than or equal to their fragment numbers;
   b) monitor the incidence of the subscribers' on-demand requests;
   c) identify the fragments in the full fractal sequencing pattern that are not required to satisfy the subscribers' requests; and
   d) delete the identified fragments from the full fractal sequencing pattern to form the sequencing pattern.

6. The system of claim 5, wherein in step c the fractal sequencer,
   tracks the most recent subscriber request, and
   identifies the numbered fragments in the full fractal sequencing pattern that are scheduled at greater than j time intervals past the most recent subscriber request where j is the period assigned to each of said fragments in the fractal sequence.

7. The system of claim 6, wherein the fractal sequencer places said upper bound on the peak bandwidth at approximately $1+\ln(N)$.

8. The system of claim 5, wherein each local server comprises:
- an interface for generating the subscriber request for a given digital item;
- a local storage for storing fragments;
- a fragment splitter for downloading fragments from the transport system during successive time intervals in response to the subscriber request and storing them in the local storage so that the first fragment is available within one time interval from the subscriber request and thereafter the succeeding numbered fragments are available within their respective periods; and
- a reassembly processor for reading each successive fragment from said local storage and integrating it with the preceding fragment to seamlessly deliver the digital item to the local subscriber.

9. The system of claim 5, wherein the fragments are scheduled at their assigned periods with respective offsets in the full fractal sequencing pattern and a number L of said fragments being prestored in the local servers, said fractal sequencer in step a being programmed to:
- a) initialize a control variable equal to L+1 to indicate the current fragment for sequencing;
- b) initialize a plurality of fractal trees equal to the number of channels where the fractal trees have root nodes $P_j$ in a base set that includes successive prime numbers up to the number of trees, said fractal trees being expanded by splitting its root node into $P_j$ branches $B_i$, which terminate at unassigned leaf nodes having prime factors $R_i$ for $i=0$ to $P_j-1$, said leaf nodes having broadcast periods equal to the product of the prime numbers assigned to the leaf nodes traversed from the root node to the particular leaf node;
- c) select one of the fractal trees and one of its unassigned leaf nodes based upon the unassigned leaf nodes' broadcast periods;
- d) compute an expansion factor, which is the largest integer which when multiplied by the period of the selected leaf node is less than or equal to the value of control variable;
- e) if the expansion factor equals one, assign the current fragment to the current leaf node, increment the control variable, and return to step c until all of the fragments are assigned;
- f) if the expansion factor is greater than one, compute a prime factorization of the extension factor to generate an ordered list of prime factors;
- g) recursively spawn subtrees from the current leaf node until the ordered list is exhausted, said subtrees including a plurality of leaf nodes equal to the respective prime factor, said current leaf node being reset to the first leaf node in the successively spawned subtrees;
- h) assign the current fragment to the current leaf node, increment the control variable, and return to step c until all of the fragments are assigned;
- i) compute each fragment's period as the product of the prime factors $R_i$ associated with the leaf nodes traversed from the root node to the fragments' assigned leaf node;
- j) compute each fragment's offset as a function of the branches $B_i$ and prime factors $R_i$ traversed from the root node to the fragment's leaf node; and
- k) assign the fragments to the designated channels in accordance with the fragments' periods and offsets.

10. The system of claim 9, wherein the fractal sequencer is programmed to select the fractal tree and leaf node in step c by:
- computing a match score for each of the unassigned leaf nodes, said match scores being equal to the difference between the value of the control variable and the largest integer multiple of the broadcast period that is smaller than the value of the control variable; and
- selecting the leaf node having the smallest match score, and if two or more match scores are equal, selecting the leaf node having the largest broadcast period.

11. The system of claim 10, wherein the fractal sequencer is programmed to compute each fragment's offset in step j as follows:

$$\text{Offset} = \sum_{p=2}^{q} B_p \prod_{k=1}^{p-1} R_k + B_1$$

where q is the number of nodes traversed from the root node to the fragment's leaf node.

12. The system of claim 1, wherein the sequencing processor is programmed to implement a hybrid sequencer which selects linear and fractal sequencers when the incidence of requests is less and greater than the threshold, respectively, to generate the sequencing pattern, said linear sequencer responding to each successive request by augmenting the sequencing pattern with those fragments that cannot be captured by the requesting subscriber from the existing sequencing pattern and said fractal sequencer generating a full fractal sequencing pattern and, based upon the incidence of requests, omitting those fragments that are not required to service the subscribers.

13. The system of claim 12, wherein the hybrid sequencer further includes forward and reverse transition sequencers for executing the linear-to-fractal and fractal-to-linear transitions, respectively.

14. The system of claim 13, wherein the forward transition sequencer is programmed to:
- determine those fragments that would have to be added to the existing sequencing pattern using the linear sequencer to satisfy the most recent subscriber request when that request causes the incidence of requests to cross a threshold; and
- reschedule all of the fragments in the existing sequencing pattern and the additional fragments to conform to a fractal sequencing pattern.

15. The system of claim 14, wherein the forward transition sequencer reschedules the fragments by:
- generating a plurality of candidate fractal sequencing patterns;
- computing a mismatch between each of the candidate fractal sequencing patterns and the existing sequencing pattern with the additional fragments;
- selecting the candidate fractal sequencing pattern with the smallest mismatch; and
- scheduling the remaining mismatched fragments as transition fragments.

16. The system of claim 15, wherein the candidate fractal sequencing patterns are generated by:
- initializing a plurality of fractal trees having root nodes $P_j$ in a base set that includes successive prime numbers up to the number of trees, said fractal trees being expanded by splitting its root node into $P_j$ branches $B_i$, which terminate at unassigned leaf nodes having prime factors $R_i$ for $i=0$ to $P_j-1$, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B1$$

where q is the number of nodes traversed from the root node to the fragment's leaf node;

assigning the numbered fragments to the leaf nodes such that their assigned periods are less than or equal to their fragment numbers; and interchanging the branches Bi to generate the candidate fractal sequencing patterns, in which the same leaf node in each pattern has the same period but a different offset.

17. The system of claim 15, wherein the candidate fractal sequencing patterns are generated by:

initializing a plurality of fractal trees having root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B1$$

where q is the number of nodes traversed from the root node to the fragment's leaf node;

assigning the numbered fragments to the leaf nodes such that their assigned periods are less than or equal to their fragment numbers; and swapping the positions of the numbered fragments between trees so that the newly assigned period for each of the fragments is less than or equal to its number.

18. The system of claim 13, wherein the reverse transition circuit is programmed to:

keep the existing sequencing pattern from the fractal sequencer intact when the most recent request causes the incidence of requests to cross a threshold; and schedule the additional fragments required for the most recent request and subsequent thereafter according to the linear sequencer.

19. The system of claim 13, wherein the reverse transition sequencer is programmed to:

maintain all of the subscriber requests for the last N time intervals;

when the incidence of requests falls below the threshold, determine the assigned periods $T_k$ for each of the N fragments;

identify the earliest request that is no more than $T_k$ time intervals prior to the scheduled broadcast time interval for the $k^{th}$ fragment;

schedule the $k^{th}$ fragment for broadcast at the $k^{th}$ time interval after its corresponding earliest request; and schedule the most recent and subsequent requests with the linear sequencer.

20. The system of claim 13, wherein the hybrid sequencer selects the linear sequencer when the incidence of requests is less than a threshold, said linear sequencer being programmed to:

a) in response to a first request for the digital item, schedule the item's fragments in order at successive time intervals;

b) in response to each successive request, determine the fragments that the existing sequencing pattern is incapable of delivering to the requesting subscriber; and c) add those fragments to the existing sequencing pattern at the latest time intervals that will satisfy the requirements of the requesting subscriber's local server to seamlessly integrate the fragments, and the hybrid sequencer selects the fractal sequencer when the incidence of requests is greater than the threshold, said fractal sequencer being programmed to:

d) computes a full fractal sequencing pattern, in which the fragments are scheduled to have broadcast periods less than or equal to their fragment numbers;

e) monitor the incidence of the subscribers' on-demand requests;

f) track the most recent subscriber request to identify the numbered fragments in the full fractal sequencing pattern that are scheduled at greater than j time intervals past the most recent subscriber request where j is the number corresponding to each of said fragments' assigned periods; and g) delete the identified fragments from the full fractal sequencing pattern to form the sequencing pattern.

21. A system for delivering on-demand digital information to a plurality of local subscribers, comprising:

a fragmentation unit that provides a digital item as a sequence of N numbered fragments;

a linear sequencer that responds to subscriber requests occurring at an incidence less than a given threshold by generating a linear sequencing pattern for broadcasting said fragments, said sequencing processor responding to subsequent requests for the digital item by adding those fragments needed to service the requests to the existing linear sequencing pattern;

a fractal sequencer that responds to subscriber requests occurring at an incidence greater than the given threshold by generating a fractal sequencing pattern for broadcasting said fragments, said fractal sequencer computing a full fractal pattern in which each fragment is scheduled with a broadcast period less than or equal to its associated number and then selectively deleting fragments from the full fractal pattern in accordance with the incidence of subscriber requests to form the fractal sequencing pattern; and a transition sequencer for controlling the transition from the linear-to-fractal and fractal-to-linear sequencing patterns when the incidence of requests cross the given threshold by generating a transition pattern;

a sequencer generator that sequencer the fragments into a multi-channel data stream in accordance with said linear, fractal, and transition sequencing patterns;

a digital transport system that continuously broadcasts the multi-channel data stream over a plurality of channels at successive time intervals to the local subscribers; and a plurality of local servers for extracting the fragments from the multi-channel data stream, seamlessly integrating the fragments and delivering them to a plurality of playback devices.

22. The system of claim 21, wherein the transition sequencer includes a forward transition sequencer that:

determines those fragments that would have to be added to the existing linear sequencing pattern using the linear sequencer to satisfy the most recent subscriber request when that request causes the incidence of requests to cross the given threshold; and reschedules all of the fragments in the existing linear sequencing pattern and the additional fragments to conform to a fractal sequencing pattern.

23. The system of claim 22, wherein the forward transition sequencer reschedules the fragments by:

generating a plurality of candidate fractal sequencing patterns;

computing a mismatch between each of the candidate fractal sequencing patterns and the existing sequencing pattern with the additional fragments;

selecting the candidate fractal sequencing pattern with the smallest mismatch; and scheduling the remaining mismatched fragments as transition fragments.

24. The system of claim 23, wherein the candidate fractal sequencing patterns are generated by:

initializing a plurality of fractal trees having root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B1$$

where q is the number of nodes traversed from the root node to the fragment's leaf node;

assigning the numbered fragments to the leaf nodes such that their assigned periods are less than or equal to their fragment numbers; and interchanging the branches Bi to generate the candidate fractal sequencing patterns, in which the same leaf node in each pattern has the same period but a different offset.

25. The system of claim 23, wherein the candidate fractal sequencing patterns are generated by:

initializing a plurality of fractal trees having root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B1$$

where q is the number of nodes traversed from the root node to the fragment's leaf node;

assigning the numbered fragments to the leaf nodes such that their assigned periods are less than or equal to their fragment numbers; and swapping the positions of the numbered fragments between trees so that the newly assigned period for each of the fragments is less than or equal to its number.

26. The system of claim 21, wherein the transition sequencer includes a reverse transition sequencer that:

keeps the existing fractal sequencing pattern from the fractal sequencer intact when the most recent request causes the incidence of requests to fall below the threshold; and schedules the additional fragments required for the most recent request and subsequent requests according to the linear sequencer.

27. The system of claim 21, wherein the transition sequencer includes a reverse transition sequencer that:

maintains all of the subscriber requests for the last N time intervals;

when the incidence of requests falls below the threshold, determine the assigned periods $T_k$ for each of the N fragments;

identify the earliest request that is no more than $T_k$ time intervals prior to the scheduled broadcast time interval for the $k^{th}$ fragment;

schedule the $k^{th}$ fragment for broadcast at the $k^{th}$ time interval after its corresponding earliest request; and schedule the most recent and subsequent requests with the linear sequencer.

28. The system of claim 21, wherein linear sequencer is programmed to:

a) in response to a first request for the digital item, schedule the item's fragments in order at successive time intervals;

b) in response to each successive request, determine the fragments that the existing sequencing pattern is incapable of delivering to the requesting subscriber; and c) add those fragments to the existing sequencing pattern at the latest time intervals that will satisfy the requirements of the requesting subscriber's local server to seamlessly integrate the fragments, and said fractal sequencer being programmed to:

d) compute the full fractal sequencing pattern;

e) monitor the incidence of the subscribers' on-demand requests;

f) track the most recent subscriber request to identify the numbered fragments in the full fractal sequencing pattern that are scheduled at greater than j time intervals past the most recent subscriber request where j is the period assigned to each of said fragments in the fractal sequence; and g) delete the identified fragments from the full fractal sequencing pattern to form the fractal sequencing pattern.

29. A method for delivering on-demand digital information to local subscribers, comprising
- fragmenting a digital item into a sequence of N numbered fragments;
- monitoring the incidence of on-demand requests for the digital item from a plurality of local subscribers;
- generating a sequencing pattern for scheduling the fragments at successive time intervals over a bandwidth, said sequencing pattern dynamically allocating the bandwidth based upon the incidence of requests to minimize the average bandwidth required to service requests occurring with an incidence less than a threshold and to place an upper bound of approximately $1+\ln(N)$ on the peak bandwidth required to service requests occurring with an incidence greater than the threshold; and
- broadcasting the fragments in accordance with the sequencing pattern so that each requesting subscriber receives the first fragment within a known number of time intervals from their respective requests and receives the successive numbered fragments in time to seamlessly integrate the numbered fragments to reconstruct the digital item.

30. The method of claim 29, wherein the sequencing pattern is generated by:
- a) in response to a first request for the digital item, scheduling the item's fragments in order at successive time intervals;
- b) in response to each successive request, determining the fragments that the existing sequencing pattern is incapable of delivering to the requesting subscriber; and
- c) adding those fragments to the existing sequencing pattern at the latest time intervals that will satisfy the requirements of the requesting subscriber's local server to seamlessly integrate the fragments.

31. The method of claim 29, wherein the sequencing pattern is generating by:
- a) computing a full fractal sequencing pattern, in which the fragments are scheduled to have broadcast periods less than or equal to their fragment numbers;
- b) identifying the fragments in the full fractal sequencing pattern that are not required to satisfy the subscribers' requests; and
- d) deleting the identified fragments from the full fractal sequencing pattern to form the sequencing pattern.

32. The method of claim 31, wherein the fragments are identified by:
- tracking the most recent subscriber request, and
- identifying the numbered fragments in the full fractal sequencing pattern that are scheduled at greater than j time intervals past the most recent subscriber request where j is the period assigned to each of said fragments in the fractal sequence.

33. A method for delivering on-demand digital information to local subscribers, comprising
- fragmenting a digital item into a sequence of N numbered fragments;
- monitoring the incidence of on-demand requests for the digital item from a plurality of local subscribers;
- if the incidence of requests is less than a given threshold, scheduling the item's fragments in order at successive time intervals to generate a linear sequencing pattern in response to a first request for the item, and thereafter responding to subsequent requests for the digital item by adding those fragments needed to service the requests to the existing linear sequencing pattern;
- if the incidence of requests is greater than the given threshold, generating a full fractal sequencing pattern by scheduling each fragment with a broadcast period less than or equal to its associated number and then selectively deleting fragments from the full fractal pattern in accordance with the incidence of the subscriber requests to form a dynamic fractal sequencing pattern;
- when the incidence of requests crosses the threshold, controlling the linear-to-fractal and fractal-to-linear sequencing pattern transitions so that the subscribers receive the first fragment within a known number of time intervals from their respective requests and receive the successive numbered fragments in time to seamlessly integrate the numbered fragments to reconstruct the digital item; and
- broadcasting the fragments in accordance with the linear and dynamic fractal sequencing patterns.

34. The method of claim 33, wherein the fragments in the full fractal pattern are selectively deleted by:
- tracking the most recent subscriber request, and
- deleting the numbered fragments in the full fractal sequencing pattern that are scheduled at greater than j time intervals past the most recent subscriber request where j is the period assigned to each of said fragments in the fractal sequence.

35. The method of claim 33, wherein the linear-to-fractal transition is executed by:
- determining those fragments that would have to be added to the existing linear sequencing pattern to satisfy the most recent subscriber request;
- generating a plurality of candidate fractal sequencing patterns;
- computing a mismatch between each of the candidate fractal sequencing patterns and the existing sequencing pattern with the additional fragments;
- selecting the candidate fractal sequencing pattern with the smallest mismatch; and
- scheduling the remaining mismatched fragments as transition fragments.

36. The method of claim 35, wherein the candidate fractal sequencing patterns are generated by:
- initializing a plurality of fractal trees having root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B1$$

where q is the number of nodes traversed from the root node to the fragment's leaf node;
- assigning the numbered fragments to the leaf nodes such that their assigned periods are less than or equal to their fragment numbers; and
- interchanging the branches Bi to generate the candidate fractal sequencing patterns, in which the same leaf node in each pattern has the same period but a different offset.

37. The method of claim 35, wherein the candidate fractal sequencing patterns are generated by:

initializing a plurality of fractal trees having root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, each of said leaf nodes having broadcast $T_i$ periods equal to the product of the prime numbers assigned to the leaf nodes traversed from the root node to the leaf node, which is given by:

$$T_i = \prod_{k=1}^{q} R_k$$

and an offset $O_i$ given by:

$$O_i = \sum_{p=2}^{q} B_p \prod_{k=1}^{p-1} R_k + B_1$$

where q is the number of nodes traversed from the root node to the fragment's leaf node;

assigning the numbered fragments to the leaf nodes such that their assigned periods are less than or equal to their fragment numbers; and swapping the positions of the numbered fragments between trees so that the newly assigned period for each of the fragments is less than or equal to its number.

38. The method of claim 35, wherein fractal-to-linear transition is executed by:

keeping the existing dynamic fractal sequencing pattern intact; and scheduling the additional fragments required for the most recent request and subsequent thereafter according to the linear sequencer.

39. The method of claim 35, wherein the fractal-to-linear transition is executed by:

maintaining all of the subscriber requests for the last N time intervals;

when the incidence of requests falls below the threshold, determining the assigned periods $T_k$ for each of the N fragments;

identifying the earliest request that is no more than $T_k$ time intervals prior to the scheduled broadcast time interval for the $k^{th}$ fragment;

scheduling the $k^{th}$ fragment for broadcast at the $k^{th}$ time interval after its corresponding earliest request; and scheduling the most recent and subsequent requests with the linear sequencer.

\* \* \* \* \*